United States Patent [19]

Nakano et al.

[11] Patent Number: 4,606,312
[45] Date of Patent: Aug. 19, 1986

[54] SYSTEM FOR DETECTING ABNORMALITIES IN GAS ENGINES

[75] Inventors: Hideaki Nakano, Akashi; Tadahiro Ozu; Tatsuo Fujii, both of Kobe, all of Japan

[73] Assignee: Kawasaki Jukogyo Kabushiki Kaisha, Kobe, Japan

[21] Appl. No.: 758,078

[22] Filed: Jul. 23, 1985

[30] Foreign Application Priority Data

Jul. 31, 1984 [JP] Japan .................. 59-118692[U]

[51] Int. Cl.[4] ................................. F02B 77/08
[52] U.S. Cl. ..................... 123/198 DB; 123/435
[58] Field of Search ....... 123/198 DB, 198 D, 198 A, 123/198 E, 435

[56] References Cited

U.S. PATENT DOCUMENTS

| | | | |
|---|---|---|---|
| 2,450,882 | 10/1948 | Costa | 123/435 |
| 2,517,976 | 8/1950 | Clarke | 123/435 |
| 2,595,524 | 3/1952 | Henneman et al. | 123/435 |
| 3,601,103 | 8/1971 | Swiden | 123/198 DB |
| 3,736,910 | 6/1973 | Raff | 123/198 DB |
| 3,738,346 | 6/1973 | Goodman | 123/198 DB |
| 3,851,469 | 12/1974 | Eichler et al. | 123/198 DB |
| 4,356,551 | 10/1982 | Iwase et al. | 123/435 |
| 4,450,811 | 5/1984 | Ichikana | 123/435 |
| 4,481,925 | 11/1984 | Karau et al. | 123/435 |

FOREIGN PATENT DOCUMENTS

| | | | |
|---|---|---|---|
| 51242 | 3/1983 | Japan | 123/435 |
| 152132 | 9/1983 | Japan | 123/435 |

Primary Examiner—Ira S. Lazarus
Attorney, Agent, or Firm—Wenderoth, Lind & Ponack

[57] ABSTRACT

A system for detecting abnormalities in a gas engine comprises: a pressure measuring device for measuring the pressure within each engine cylinder to generate corresponding signals; a device for determining from these signals the maximum pressure for every cycle of the engine operation; a comparator circuit for comparing each maximum pressure with reference values of a specific range and, when the maximum pressure is outside of that range, generating a corresponding signal indicating the existence of an abnormality; and an actuator operating in response to this signal to actuate and close a shut-off valve in the fuel gas supply line of the engine, an alarm device being simultaneously activated by this signal.

6 Claims, 9 Drawing Figures

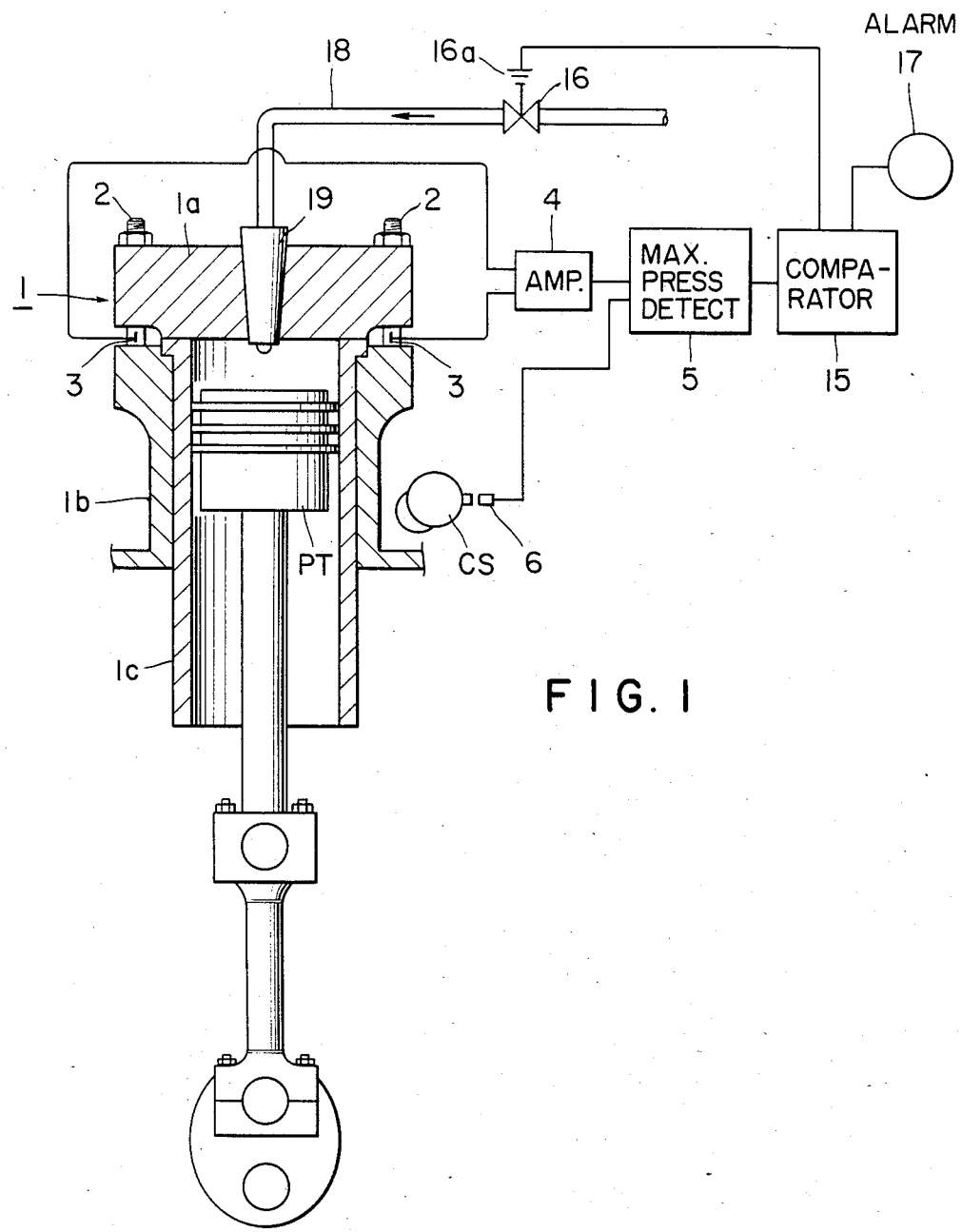
F I G. 1

SYSTEM FOR DETECTING ABNORMALITIES IN GAS ENGINES

BACKGROUND OF THE INVENTION

This invention relates generally to devices and systems for detecting physical conditions and more particularly to a system for detecting abnormal conditions in gas engines. More specifically the invention concerns a system of this character which is capable of detecting abnormal ignition and other abnormalities in a gas-combustion engine and at the same time is capable, upon detecting such an abnormality, of automatically stopping the supply of the fuel gas being injected into the engine.

Most gas engines in the past have been started by ignition systems which ignite fuel gas by means of so-called pilot oil or ignition (spark) plugs. These ignition systems, however, have occasionally been subject to failure of the fuel gas to ignite due to an abnormal condition of the injection valve for the pilot oil or of the ignition plug or, in the case of an injection valve abnormality, to a flow of a great quantity of gas into each cylinder. In the case of such an ignition failure, the gas in still uncombusted state flows into the air intake and exhaust passages and there explodes. In the case where a large quantity of the gas flows into a cylinder, the pressure within the cylinder rises to an extreme value, which is very undesirable.

Accordingly, there arises the need for a system for detecting such ignition failure or abnormal flow of the gas into each cylinder and thereupon automatically stopping the supply of the injected gas. The principal systems of this character known heretofore are the following five.

(a) A system in which an exhaust gas temperature gage is installed in the exhaust pipe to detect any abnormal fall or rise in the exhaust gas temperature.

(b) A system in which the output signal from a device for detecting the pressure within a cylinder is processed as it is by a computer, and quantities such as the maximum pressure within the cylinder and the rate of pressure rise are computed thereby to detect abnormal conditions.

(c) A system in which the exhaust gas within the exhaust pipe is sampled, and defective operation such as ignition failure or sticking of a needle valve is detected.

(d) A system in which the lift of the gas valve is detected by a displacement sensor, and any abnormal operation of the gas valve is detected.

(e) A system in which an orifice is installed within the gas supply passage or pipe, and the difference in the pressures respectively upstream and downstream of this orifice detected thereby to detect abnormalities in the gas flow rate.

The above five systems, however, are accompanied by the following difficulties.

(a) In the system (a), since a relatively long time is required for the detection of abnormalities, the engine operation goes through a number of cycles from the instant of an abnormality occurrence to the stopping of the gas supply, and during this time, unburned gas flows into the intake and exhaust passages.

(b) In the system (b), since the phenomenon occurs at high speed, a computer possessing a large processing capacity becomes necessary for analysis for every cycle, and the constitution of the system becomes complicated.

(c) In the system (c), a relatively long time is required before detection similarly as in the case of system (a).

(d), (e) In the systems (d) and (e), while the phenomenon of abnormal gas flow into the cylinder can be determined, ignition failures cannot be detected.

SUMMARY OF THE INVENTION

This invention aims to solve the above described problems encountered in the prior art by providing an abnormality detection system for gas engines which is capable of promptly detecting abnormal phenomena such as ignition failure and flow of a large quantity of fuel gas into a cylinder and, in response to the detection, automatically stopping the supply of the gas, and which, moreover, is of simple constitution of low production cost and has high reliability.

According to this invention, briefly summarized, there is provided a system for detecting abnormal states in a gas engine and, upon detection of an abnormal state, reacting promptly to close a shut-off valve in the fuel gas supply line, the system comprising: pressure detecting means for detecting the pressure within each cylinder to generate corresponding detection values; maximum pressure detecting means for determining from said detection values the maximum pressure within the cylinder for every cycle of the engine operation; comparator means for comparing each maximum pressure thus determined with reference values of a specific range and, when said maximum pressure is outside of said range, generating a corresponding signal; and actuating means operating in response to said signal to actuate the shut-off valve.

The nature, utility, and further features of this invention will be more clearly apparent from the following detailed description with respect to a preferred embodiment of the invention when read in conjunction with the accompanying drawings, briefly described below.

BRIEF DESCRIPTION OF THE DRAWINGS

FIG. 1 is a schematic diagram which is a combination of a block diagram, a gas supply pipeline, and a longitudinal section of a gas engine cylinder, piston, and related parts, and which shows the essential parts of one example of the abnormality detection system for gas engines according to this invention;

DETAILED DESCRIPTION OF THE INVENTION

Figure 2:
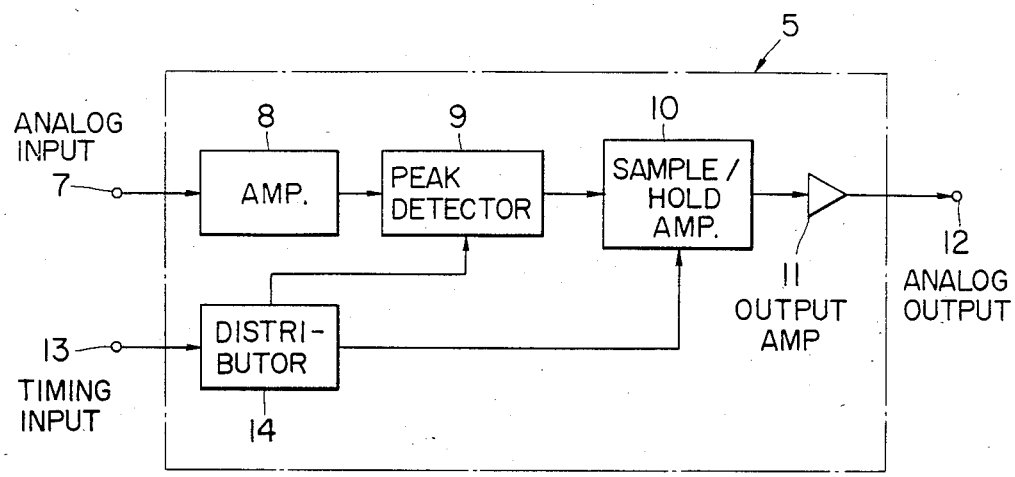
FIG. 2 is a block diagram showing the essential constitution of one example of a maximum pressure detecting means in the system shown in FIG. 1.

For the sake of simplicity of the description, the abnormality detecting system of this invention will now be described with respect to its application to a single gas engine cylinder 1 as illustrated in FIG. 1. The essential parts of this cylinder 1 are a cylinder head 1a, a cylinder block 1b, to which the cylinder head 1a is fixed by cylinder head bolts 2, and a cylinder liner 1c. A piston PT is reciprocatably fitted in the cylinder 1. A fuel pipe line 18 for feeding fuel gas into the cylinder 1 is connected at its one end to a gas source (not shown) and at its other end to a gas injection valve 19 in the cylinder head 1a. A strain gage 3 for functioning as means for detecting the pressure within the combustion chamber of the cylinder 1 is mounted on each cylinder head bolt 2 at the joint between the cylinder head 1a and the cylinder block 1b.

These strain gages 3 are subject to strain proportional to the inner pressure of the cylinder and, in response to this strain, produce an output, which is amplified by an amplifier 4 and introduced into detecting means 5 for detecting maximum pressure within the cylinder 1. A timing pulse generating means 6 is adapted to be activated preferably by the camshaft CS of the gas engine to produce a timing pulse output, which is introduced as input into the means 5 for detecting maximum cylinder interior pressure together with the above described detection signal. This timing pulse generating means 6 has the function of generating a pulse for every operational cycle of the engine, i.e., every revolution in the case of a two-cycle (two-stroke cycle) engine.

The above mentioned maximum pressure detecting means 5 determines the maximum pressure within the cylinder 1 in every cycle from the analog value detected by the strain gages 3 and the timing pulse input and, at the same time, continuously produces a corresponding output.

A specific example of this maximum pressure detecting means 5, of a constitution as shown in FIG. 2, has an analog input terminal 7 into which is fed the above described analog signal indicative of the pressure within the cylinder. This analog signal is amplified in an amplifier 8 and fed into a peak detector 9, by which the maximum pressure is detected. The value of the resulting peak detection output is held by a sample/hold amplifier 10, then amplified by an output amplifier 11, and sent out as output through an analog output terminal 12.

On the other hand, the timing pulse is introduced as input into this detection means through a timing input terminal 13 and is fed into a distributor 14 to be distributed to the peak detector 9 and to the sample/hold amplifier 10. Thus, by the introduction of this timing pulse, the detection of the maximum pressure and the holding and outputting of the corresponding signal thereof are carried out for every cycle of the engine.

Figure 3A:
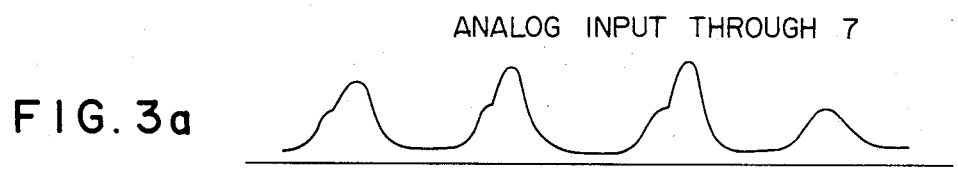
FIGS. 3a, 3b, and 3c are diagrams respectively indicating the variations of the analog input, timing input, and analog output with time of the maximum pressure detecting means shown in FIG. 2.
Figure 3B:
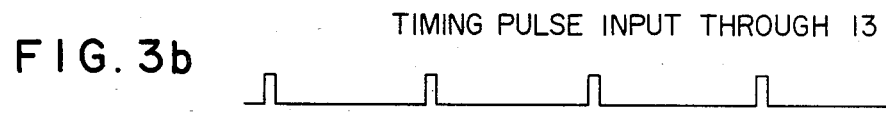
Figure 3C:
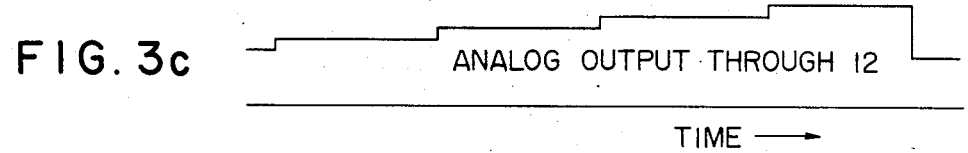

Examples of the input and output signals of the above described maximum pressure detecting means 5 are indicated on a common time scale in FIGS. 3a, 3b, and 3c. FIG. 3a indicates the analog pressure signal introduced through the analog input terminal 7; FIG. 3b, the timing pulse signal introduced through the timing input terminal 13; and FIG. 3c, the analog output signal transmitted through the analog output terminal 12.

The output signal of the maximum pressure detecting means 5 thus obtained is fed into a comparator means 15, as shown in FIG. 1, and is there compared with a reference value. In this case, in consideration of some inevitable deviations in the maximum pressure within the cylinder at the time of normal operation, an upper limit P1 and a lower limit P2 thereof is determined as indicated in FIG. 5b, and a marginal allowance value $\Delta P$ is further applied, whereby $P1+\Delta P$ and $P2-\Delta P$ are respectively prescribed as upper and lower boundary or delimitation values between normal state and abnormal state. The above mentioned reference value for comparison comprises this range of values.

Accordingly, the maximum pressure within the cylinder in each instance is compared with this reference value range, and when the maximum pressure is outside of this reference value range, an output signal is generated by the comparator means 15 and activates an actuator 16a, which thereupon actuates a shut-off valve 16 in the fuel gas supply pipe line 18 as shown in FIG. 1 to close the flow path of the gas. One example of the actuator 16a is a solenoid mechanism. At the same time, this output signal activates an alarm 17, which may be an audible or visible alarm or a combination of audible and visible alarms.

Figure 4:
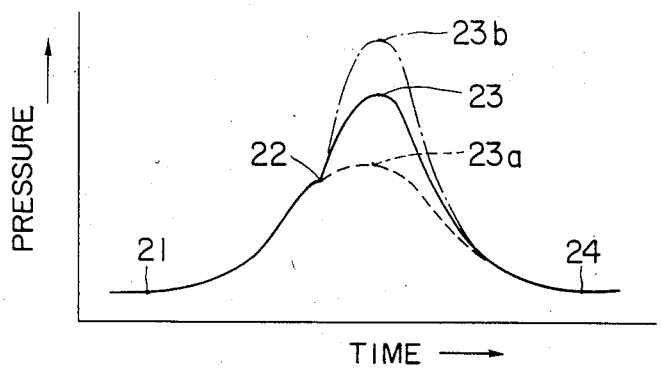
FIG. 4 is a graph indicating variations of pressure within a gas engine cylinder with time.

Examples of waveforms of pressure within the cylinder 1 are shown in FIG. 4. When this pressure within the cylinder is normal, it rises from 21 to 22 as compression takes place. At this time, a pilot oil is injected into the cylinder 1 and ignites, at the same time inducing flash ignition of the fuel gas. The cylinder internal pressure thereupon rises rapidly as from 22 to 23 to reach a maximum value, after which, together with the descent of the piston PT, the cylinder pressure also drops as from 23 to 24. However, in the case of an abnormality such as failure of the fuel gas to ignite, the cylinder pressure rises from 21 to 22 similarly as in the above described normal case, but the pressure rise thereafter will be only that due to combustion of the pilot oil, and almost no rise in pressure will occur as indicated by the curve 22 to 23a.

Figure 5A:
FIGS. 5a and 5b are graphical diagrams indicating variations with time of pressure within a cylinder in correlation with variation of maximum pressure value.
Figure 5B:
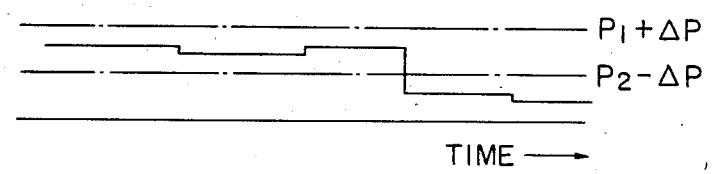

An example of a detected pressure waveform produced in the case wherein such a phenomenon occurs is shown in FIG. 5a, and that of the maximum pressure value which is outputted is indicated in FIG. 5b. In the case of an ignition failure, the resulting maximum pressure value does not reach the lower boundary or delimitation value $P2-\Delta P$ of the reference value range, whereby this abnormal phenomenon is detected, and at the same time the closure of the shut-off valve 16 and the operation of the alarm 17 are carried out as described hereinabove.

On the other hand, in the case where an abnormality occurs in the gas injection valve 19, and a large quantity of gas flows into the cylinder 1, the value of the maximum pressure within the cylinder rises remarkably as indicated by curve 22 to 23b in FIG. 4. Consequently, conversely to the above described abnormal phenomenon, the maximum pressure value exceeds the upper boundary value $P1+\Delta P$, whereby it is possible to detect the occurrence of the abnormality.

Figure 6:
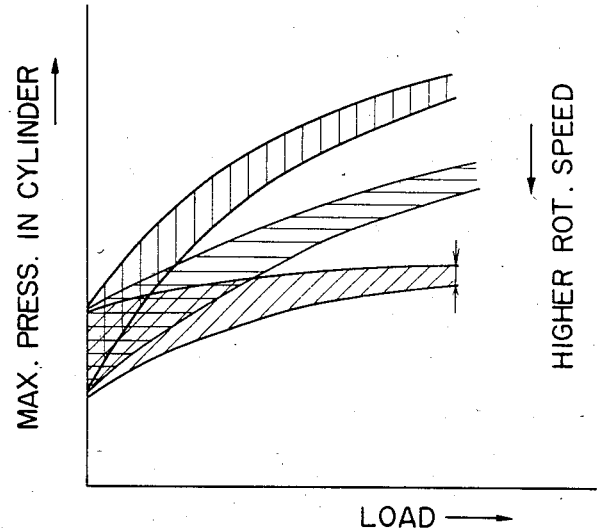
FIG. 6 is a graph indicating variations of ranges of reference pressure with respect to the relationship between load and revolution speed.

The above described reference value range of the maximum pressure in the cylinder fluctuates with the operational conditions of the engine, that is, the load and the revolution speed. Accordingly, by drafting beforehand a zonal map of normal pressure ranges corresponding to these variations, as indicated in FIG. 6, storing this map in a memory component of the system, and providing beforehand means for computing the normal pressure range at any time in the operation in response to signals indicative of the operational conditions at that time, it becomes possible to obtain accurate and positive functioning of the abnormality detection system of this invention for a wide range of engine operational conditions.

As described above, in the event of an abnormality in the operation of the engine, such as ignition failure or flowing of a large quantity of gas into the cylinder, the detection system of this invention functions promptly to compare the maximum pressure within the cylinder in the same cycle as the abnormality with the reference value range. Then, since this maximum pressure is outside of the reference value range, the above described comparator means 15 promptly generates and transmits a signal, in response to which the supply of fuel gas into the cylinder is shut off, and at the same time an alarm is emitted audibly, visibly, or both audibly and visibly. Thus the operational safety of the gas engine is remarkably improved. Furthermore, since the above described surveillance is accomplished for every consecutive cycle of the engine operation, prompt and positive detection of abnormal phenomena together with quickly responsive shutting off of the fuel gas can be carried out.

While the system for detecting abnormal conditions in a gas engine according to this invention has been described with respect to a single embodiment of the invention, the system of this invention is not so limited but can assume various modified modes. For example, in the above described embodiment, strain gages are used as means for detecting the pressure within the engine cylinder, but it is also possible to use an electrical pressure gage for direct detection of the cylinder internal pressure. It is also possible to determine the lower limit P2 on the basis of the compression pressure which is calculated from the charge air pressure and the engine compression ratio.

In addition to the various meritorious features described above of the system for detecting abnormal conditions of a gas engine according to this invention, this system has the advantageous features of relatively simple constitution and arrangement, low production cost, and high reliability.

What is claimed is:

1. A system for detecting abnormalities in a gas engine with at least one cylinder and a fuel gas shut-off valve and means for closing the shut-off valve upon detection of an abnormality, said system comprising: pressure detecting means for detecting the pressure within each cylinder to generate corresponding detection values; maximum pressure detecting means for determining from said detection values the maximum pressure within the cylinder for every cycle of the engine operation; comparator means for comparing each maximum pressure thus determined with reference values of a specific range and, when said maximum pressure is outside of said range, generating a corresponding signal; and actuating means operating in response to said signal to actuate the shut-off valve.

2. A system according to claim 1 in which the pressure detecting means comprises electrical strain gages so mounted on respective cylinder head bolts fixing each cylinder head to the cylinder block of the engine as to be subjected to strain indicative of the pressure within the cylinder thereby to generate strain detection signals and an amplifier for amplifying said detection signals to produce as output said detection values.

3. A system according to claim 1 in which the maximum pressure detecting means is provided with a timing pulse generating means driven by a cyclically moving part of the engine to generate timing pulses which are transmitted to the maximum pressure detecting means.

4. A system according to claim 3 in which the maximum pressure detecting means comprises: an input amplifier for receiving as an input and amplifying said detection values; a peak detector for receiving the output of the input amplifier, detecting the maximum pressure and generating a corresponding peak detection output; a sample/hold amplifier for holding said peak detection output; and an output amplifier for amplifying the output of the sample/hold amplifier to produce an output indicative of the maximum pressure of each cycle, said output being transmitted to the comparator means; and a distributor for receiving said timing pulses as input and distributing the same to the peak detector and to the sample/hold amplifier.

5. A system according to claim 1 in which the pressure detecting means comprises an electric pressure measuring device for directly measuring the pressure within each engine cylinder.

6. A system according to claim 1 in which said signal generated by the comparator means activates an alarm device.

* * * * *